(12) United States Patent
Zhou et al.

(10) Patent No.: US 8,842,636 B2
(45) Date of Patent: Sep. 23, 2014

(54) METHOD AND DEVICE FOR MANAGING INTERNET PROTOCOL OFFLOAD CONNECTION

(75) Inventors: Na Zhou, Shenzhen (CN); Shuang Liang, Shenzhen (CN); Jing Wang, Shenzhen (CN); Zaifeng Zong, Shenzhen (CN); Yuzhen Huo, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 249 days.

(21) Appl. No.: 13/505,686

(22) PCT Filed: Oct. 18, 2010

(86) PCT No.: PCT/CN2010/077843
§ 371 (c)(1),
(2), (4) Date: May 2, 2012

(87) PCT Pub. No.: WO2011/054247
PCT Pub. Date: May 12, 2011

(65) Prior Publication Data
US 2012/0218974 A1    Aug. 30, 2012

(30) Foreign Application Priority Data

Nov. 5, 2009  (CN) .......................... 2009 1 0209677

(51) Int. Cl.
*H04W 36/22*    (2009.01)
*H04L 29/06*    (2006.01)
*H04W 76/02*    (2009.01)
*H04W 80/04*    (2009.01)

(52) U.S. Cl.
CPC ............. *H04L 69/161* (2013.01); *H04W 80/04* (2013.01); *H04W 76/021* (2013.01)
USPC .......................................... 370/331; 370/338

(58) Field of Classification Search
CPC ... H04W 4/005; H04W 80/04; H04W 76/021; H04L 69/161; H04L 41/12
USPC .......... 370/312, 315, 328, 329, 331; 455/436, 455/437, 414.1
See application file for complete search history.

(56) References Cited

U.S. PATENT DOCUMENTS

| | | | | |
|---|---|---|---|---|
| 2004/0266438 | A1* | 12/2004 | Bjelland et al. | 455/437 |
| 2011/0075675 | A1* | 3/2011 | Koodli et al. | 370/401 |
| 2012/0182940 | A1* | 7/2012 | Taleb et al. | 370/328 |
| 2013/0294413 | A1* | 11/2013 | Kim et al. | 370/331 |

FOREIGN PATENT DOCUMENTS

| | | |
|---|---|---|
| CN | 1588902 A | 3/2005 |
| CN | 101018193 A | 8/2007 |
| CN | 101083830 A | 12/2007 |
| CN | 101483585 A | 7/2009 |
| CN | 101527935 A | 9/2009 |

* cited by examiner

*Primary Examiner* — Afsar M Qureshi
(74) *Attorney, Agent, or Firm* — Bright IP Law Offices

(57) ABSTRACT

The disclosure discloses a method and a device for managing Internet Protocol (IP) offload connection. The method comprises the steps of: determining that a target Mobility Management Entity (MME) supports IP offload or identifies information of two Serving Gateways (S-GWs); the target MME receiving IP offload connection information from an source MME; the target MME processing the IP offload connection according to the IP offload connection information, wherein the process comprises one of the following: establishing, updating and activating the IP offload connection. With the disclosure, the experience of the user is enhanced in the wireless communication system.

20 Claims, 11 Drawing Sheets

METHOD AND DEVICE FOR MANAGING INTERNET PROTOCOL OFFLOAD CONNECTION

CROSS REFERENCE TO RELATED APPLICATIONS

This application is the U.S. National Stage of International Patent Application No. PCT/CN2010/077843 filed on Oct. 18, 2010, which claims priority to Chinese Patent Application No. 200910209677.5 filed on Nov. 5, 2009. Both the PCT Application and Chinese Application are hereby incorporated by reference in their entirety.

FIELD OF THE INVENTION

The disclosure relates to the field of communications, in particular to a method and a device for managing Internet Protocol (IP) offload connection.

BACKGROUND OF THE INVENTION

A 3rd Generation Partnership Project (3GPP) Evolved Packet System (EPS) consists of an Evolved Universal Terrestrial Radio Access Network (E-UTRAN), a Mobility Management Entity (MME), a Serving Gateway (S-GW), a Packet Data Network Gateway (P-GW or PDN GW), a Home Subscriber Server (HSS), a 3GPP Authentication, Authorization and Accounting (AAA) server, a Policy and Charging Rules Function (PCRF) entity and other support nodes.

FIG. 1 shows a first diagram of the connection of a wireless communication network according to relevant technology, wherein the MME takes charge of the related work of control plane, such as mobility management, processing of non-access layer signaling and context management in user mobility management; the S-GW is an access gateway device, which is connected with the E-UTRAN and is configured to forward data between the E-UTRAN and the P-GW and take charge of the caching of paging waiting data; the P-GW is a border gateway of the EPS and Packet Data Network (PDN) and takes charge of the access of the PDN and the data forwarding between the EPS and the PDN; both S-GW and P-GW are core network gateways.

Home (e)NodeB is a small low-power base station, which is deployed in indoor places such as home and office, with a main purpose of providing a higher service speed for a user, reducing the expense associated with a high-speed service, and meanwhile remedying the coverage shortage of an existing distributed cellular wireless communication system. The Home (e)NodeB has advantages of affordable price, convenience, low-power output, and plug and play, etc.

FIG. 2 shows a second diagram of the connection of a wireless communication network according to relevant technology; in a Home (e)NodeB system, the Home (e)NodeB is a wireless side network element, wherein the Home (e)NodeB can be directly connected to the core network, as shown in FIG. 1; the Home (e)NodeB also can be connected to the core network through a logic network element such as a Home (e)NodeB gateway, as shown in FIG. 2; the Home (e)NodeB gateway mainly has the functions of: verifying the security of the Home (e)NodeB, processing the registration of the Home (e)NodeB, maintaining and managing the Home (e)NodeB, configuring and controlling the Home (e)NodeB according to the requirement of an operator, taking charge of data exchange between the core network and the Home (e)NodeB.

In the Home (e)NodeB system, there is a concept of Closed Subscriber Group (CSG) which allows the user to access one or more access restricted CSG-cells. The operating mode of the Home (e)NodeB can be divided into a closed mode, a hybrid mode and an open mode. When the Home (e)NodeB is in closed mode, only the CSG users belonging to the Home (e)NodeB can access the base station and enjoy the services provided by the base station; when the Home (e)NodeB is in open mode, any user can access the base station, at this moment, the Home (e)NodeB is equivalent to a macro base station in usage; when the Home (e)NodeB is in hybrid mode, both CSG users and other user are allowed to have an access, but the user types are differentiated according to whether the user belongs to the CSG list so as to realize differentiated Quality of Service (QoS) process, that is to say, the CSG users have a higher service priority and have better QoS and service types when using the hybrid mode of Home (e)NodeB.

Besides supporting the access of the mobile core network, the mobile communication system (including the Home (e)NodeB) also can support an IP offload function (for example, the IP offload can be a local IP access), under the conditions that the wireless side network element has an IP offload capability and the user subscription allows IP offload, the local access of a UE to other IP devices of the home network or the internet can be realized.

The implementation of IP offload can provide a strong support for the data offload technology by adding a local gateway; as a gateway of the local access to external network (for example, internet), the local gateway provides functions such as address allocation, charging, packet filtering, policy control, traffic offload function, NAS/S1-AP/Radios Access Network Application Part (RANAP)/General Tunneling Protocol (GTP)/Proxy Mobile IP (PMIP)/Mobile IP (MIP), message resolution, Network Address Translation (NAT), and IP offload policy routing and execution, etc. The local gateway can be integrated with/separated from the wireless side network element (as shown in FIG. 1).

FIG. 3 shows a third diagram of the connection of a wireless communication network according to relevant technology; as shown in FIG. 3, under the condition that a Home (e)NodeB gateway exists, the local gateway not only can be integrated with/separated from the Home (e)NodeB, also can be separated from/integrated with the Home (e)NodeB gateway. The local gateway can be a Local SGW (L-SGW) and a Local PGW (L-PGW), can be a single L-SGW, and can be a traffic offload function entity. In addition, the Home (e)NodeB gateway can be integrated with the Home (e)NodeB. For a Universal Terrestrial Radio Access Network (UTRAN) system, the core network gateway can be a Serving GPRS Support Node (SGSN), a Gateway GPRS Support Node (GGSN). The local gateway can be a Local GGSN (L-GGSN) and a Local SGSN (L-SGSN), can be a single L-GGSN and can be a traffic offload function entity.

FIG. 4 shows a diagram of the local IP access data stream of a wireless communication system according to relevant technology; as shown in FIG. 4, taking a Long Term Evolution (LTE) mobile communication network architecture for example, the schematic data streams of the IP offload and the core network connection in the wireless communication system shown in FIG. 1 are illustrated.

FIG. 5 shows a flowchart of the interaction of a UE performing a handover process according to relevant technology; as shown in FIG. 5, based on the scene of the system architecture shown in FIG. 1, the interaction comprises the following Steps 502 to 508:

Step 502: a wireless side network element determines to initiate an S1 handover.

Step 504: an source wireless side network element sends a handover required message to an source MME.

Step 506: the source MME sends a forward relocation request message to a target MME.

Step 508: the target MME initiates a session establishment flow of the core network and the IP offload connection.

Step 510: the target MME requests a target wireless side network element to perform the handover (that is, by sending a handover request).

Step 512: the target wireless side network element responds a handover request acknowledge message to the target MME.

Step 514: the target MME sends a forward relocation response message to the source MME.

Step 516: the source MME sends a handover command to the source wireless side network element.

Step 518: the source wireless side network element sends a handover command to a UE.

Step 520: the UE initiates a handover confirm message to the target wireless side network element.

Step 522: the target wireless side network element notifies the target MME to perform the handover (that is, by sending a handover notify).

Step 524: the target MME sends a forward relocation complete notification message to the source MME.

Step 526: the source wireless side network element returns a forward relocation complete acknowledge message to the target MME.

Step 528: continue the normal handover flow.

Under the condition that the UE simultaneously has a core network connection and an IP offload connection, the MME needs to provide support for the normal establishment and maintenance of the IP offload connection; however, if the UE switches from an MME supporting IP offload to an MME not supporting IP offload, a phenomenon of handover failure of the core network connection might be caused, thus the core network service data is interrupted and the experience of the user is greatly reduced.

SUMMARY OF THE INVENTION

The disclosure is provided in view of the problem of handover failure of the core network connection caused by the handover of a UE from an MME supporting IP offload to an MME not supporting IP offload; therefore, the main object of the disclosure is to provide a method and a device for managing IP offload connection, for solving the problem above.

In order to realize the object above, according to one aspect, a method for managing IP offload connection is provided, comprising the steps of: determining that a target MME supports IP offload or identifies two S-GWs; the target MME receiving IP offload connection information from the source MME; the target MME establishing/updating/activating IP offload connection according to the IP offload connection information.

Preferably, the step of the source MME determining that the target MME supports IP offload or identifies two S-GWs further comprises: the target MME determining that the target MME supports the IP offload or identifies the two S-GWs.

Preferably, after the target MME determines that the target MME supports the IP offload or identifies the two S-GWs, the target MME transmit a context request message to the source MME and including first capability information into the context request message, wherein the first capability information is configured to represent that the target MME supports the IP offload or identifies the two S-GWs.

Preferably, the step of the target MME determining that the target MME supports the IP offload or identifies the two S-GWs comprises the steps of: the target MME, according to its own capability, determining whether it supports the IP offload locally or identifies the two S-GWs; and if it is determined to be true, the target MME determining that the target MME supports the IP offload or identifies the two S-GWs.

Preferably, if it is determined to be false, the target MME includes second capability information into the context request message transmitted to the source MME, wherein the second capability information is configured to represent that the target MME does not support the IP offload connection and does not identify the two S-GWs.

Preferably, after the target MME transmitting the context request message to the source MME, the method further comprises the steps of: the target MME canceling the process of the IP offload connection; and the target MME performing a session process of the core network connection, wherein the session process includes at least one of the following: establishment, update, and activation.

Preferably, the step of the source MME determining that the target MME supports the IP offload or identifies the two S-GWs further comprises a step of: the source MME determining that the target MME supports the IP offload or identifies the two S-GWs according to locally pre-configured capability information of the target MME or protocol version information, wherein the protocol version refers to a protocol between the target MME and the source MME.

Preferably, after the source MME determines that the target MME supports the IP offload or identifies the two S-GWs according to the locally pre-configured capability information of the target MME or the protocol version information, the source MME includes the IP offload connection information into a forward relocation request message transmitted to the target MME.

Preferably, the IP offload connection comprises one of the following: a local IP access to residential IP network, a local IP access to enterprise IP network, a local IP access to Internet, an Internet offload and a selected IP traffic offload; and the two S-GWs are a core network S-GW and a local S-GW.

In order to realize the object above, according to another aspect of the disclosure, a device for managing IP offload connection is provided, comprising: a determination module configured to determine information indicating that a target MME supports IP offload or identifies two S-GWs; a receiving module configured to receive IP offload connection information from an source MME; an establishment module configured to establish/update/activate the IP offload connection according to the IP offload connection information.

With the disclosure, the problem of handover failure of the core network connection caused by the handover of a UE from an MME supporting IP offload to an MME not supporting IP offload is solved by an source MME determining information indicating that a target MME supports IP offload or identifies a local S-GW and a target S-GW, the target MME receiving IP offload connection information from the source MME, and the target MME establishing/updating/activating the IP offload connection according to the IP offload connection information; therefore, a guarantee is provided for the normal continuous operation of the core network connection and the experience of the user in the wireless communication system is enhanced.

BRIEF DESCRIPTION OF THE DRAWINGS

For a better understanding of the disclosure, accompanying drawings described hereinafter are provided to constitute one part of the application; the schematic embodiments of the disclosure and the description thereof are used to illustrate the disclosure but to limit the disclosure improperly. In the accompanying drawings.

DETAILED DESCRIPTION OF THE EMBODIMENTS

It should be noted that the embodiments in the application and the characteristics of the embodiments can be combined if no conflict is caused. The disclosure is described below in detail by reference to the accompanying drawings in conjunction with embodiments.

In view of the problem of handover failure of the core network connection caused by the handover of a UE from an MME supporting IP offload to an MME not supporting IP offload in the relevant technology, the embodiment hereinafter provides a method and a device for managing IP offload connection, which provide a guarantee for the normal continuous operation of the core network connection and enhance the experience of the user in the wireless communication system by adopting processes of: an source MME determining information indicating that a target MME supports IP offload or identifies a plurality of S-GWs (for example, identify two S-GWs, wherein the two S-GWs can be a core network S-GW and a local S-GW), then the target MME receiving IP offload connection information from the source MME, and the target MME processing the IP offload connection according to the IP offload connection information, wherein the process comprises one of the following: establishment, update, activation of the IP offload connection (referred to hereafter as "establishing, updating and activating the IP offload connection"), so as to guarantee for the normal continuous operation of the core network connection and enhances the experience of the user in the wireless communication system.

Figure 6:
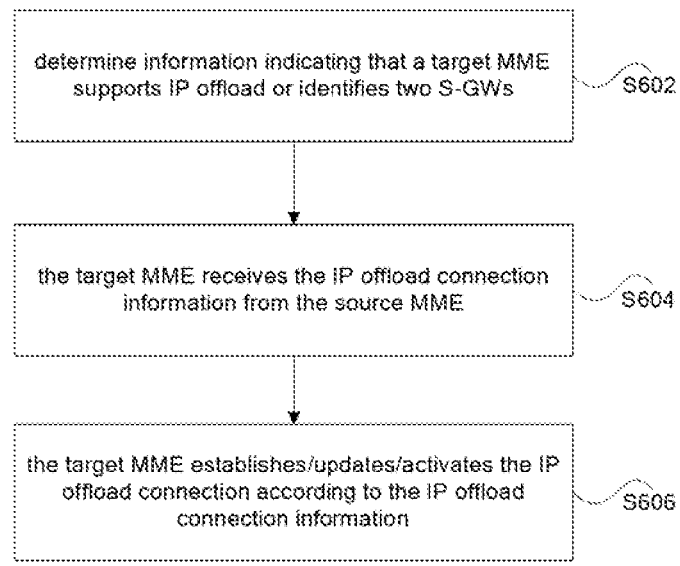
FIG. 6 shows a flowchart of a method for managing IP offload connection according to the embodiment of the disclosure.

FIG. 6 shows a flowchart of a method for managing IP offload connection according to the embodiment of the disclosure; as shown in FIG. 6, the method comprises the following Steps 602 to 606:

Step 602: determine that a target MME supports IP offload or identifies two S-GWs.

Preferably, during implementation, in the process of handover or location update, the target MME can determine that the target MME supports the IP offload or identifies the two S-GWs; then, the target MME transmits a context request message to the source MME during the location update process and includes first capability information into the context request message, wherein the first capability information is configured to indicate that the target MME supports the IP offload or identifies the two S-GWs.

Preferably, during implementation, the target MME can determine, according to its own capability, whether it supports the IP offload locally or identifies the two S-GWs; if it is determined to be true, the target MME determines that the target MME supports the IP offload or identifies the two S-GWs; if it is determined to be false, the target MME includes second capability information (that is, IP offload connection failure information) into the context request message transmitted to the source MME during the location update process, wherein the second capability information is configured to indicate that the target MME does not support the IP offload connection and does not identify the two S-GWs: then, the target MME does not establish/update/ activate the IP offload connection; instead, the target MME establishes/updates/activates a session of the core network connection (that is, by initiating the session of establishment/ update/activation flow of the core network connection).

Preferably, the step of the source MME determining that the target MME supports the IP offload or identifies the two S-GWs further comprises a step of: during the handover or location update process, the source MME, according to the locally pre-configured capability information of the target MME or protocol version information, determining information indicating that the target MME supports the IP offload or identifies the target S-GW and the local S-GW, wherein the protocol version refers to the protocol between the target MME and the source MME. Then, the source MME includes the IP offload connection information into a forward relocation request message transmitted to the target MME.

Step 604: the target MME receives the IP offload connection information from the source MME.

Step 606: the target MME establishes/updates/activates the IP offload connection according to the IP offload connection information;

in which, the IP offload connection comprises one of the following: a local IP access to residential IP network, a local IP access to enterprise IP network, a local IP access to Internet, an Internet offload and a selected IP traffic offload;

in which, the wireless side network element can be a base station, a Home (e)NodeB, a Radio Network Controller (RNC), a Home (e)NodeB gateway, a local gateway, a offload function entity, an NAT gateway. The MME can be a Mobility Management Entity (MME), a Mobile Switching Centre (MSC), a Serving GPRS Support Node (SGSN);

in which, the local gateway can be a Local SGW (L-SGW) and a Local PGW (L-PGW), can be a single L-PGW, can be a Local GGSN (L-GGSN) and a Local SGSN (L-SGSN), can be a single L-GGSN, and can be a traffic offload function entity. The local gateway can be a local access gateway and/or a local S-GW. The local access gateway is an L-PGW, an L-GGSN. The local S-GW is an L-SGW, an L-SGSN. The core network gateway can be a core network S-GW, a core network access gateway. The core network S-GW can be an S-GW, an SGSN. The core network access gateway can be a P-GW, a GGSN. The authentication and authorization server can be a user subscription database;

in which, the location update can be tracking area update, routing area update.

Preferred embodiments are provided below for illustration. The embodiment below describes the application scene based on E-UTRAN system; of course, it is not limited to this.

Embodiment 1

Figure 1:
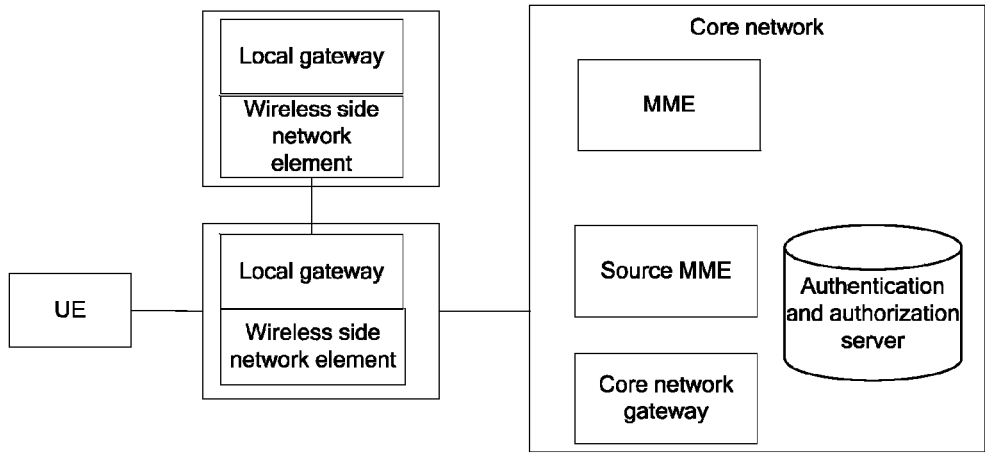
FIG. 1 shows a first diagram of the connection of a wireless communication network according to relevant technology.
Figure 7:
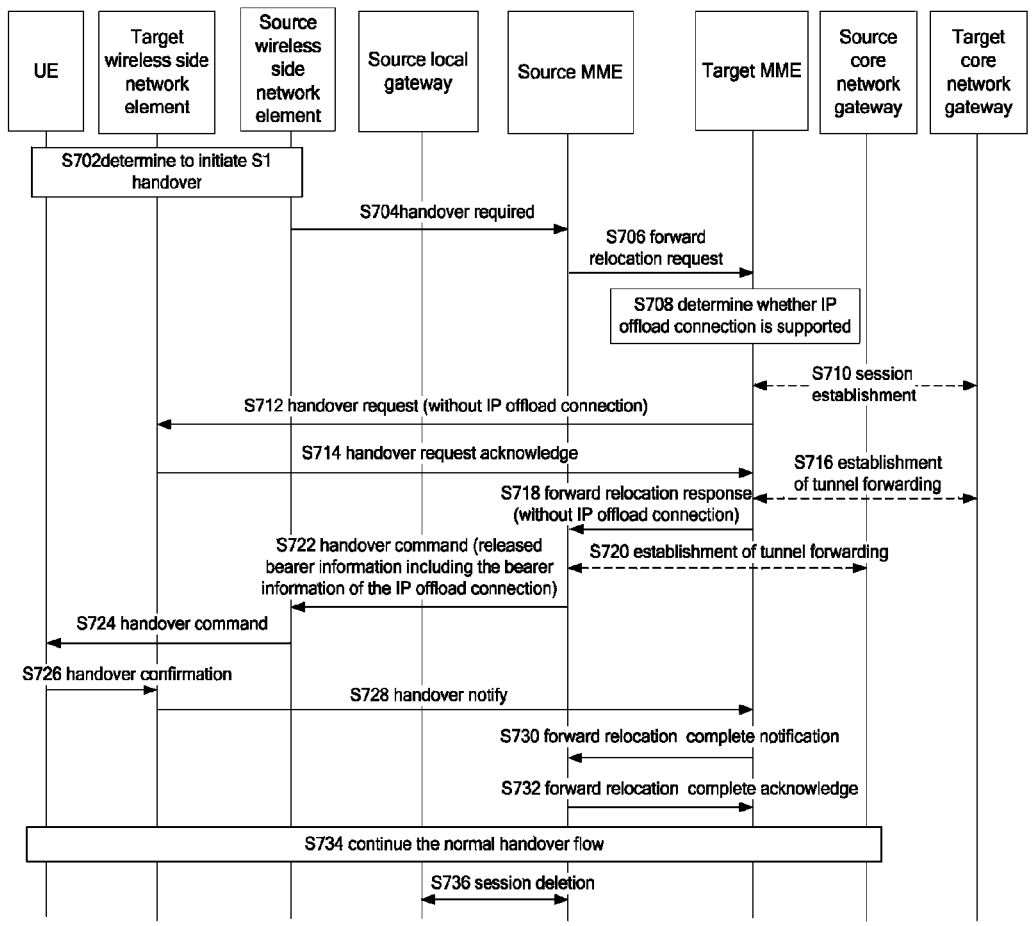
FIG. 7 shows a flowchart of a UE performing a handover process according to a first embodiment of the disclosure.

FIG. 7 shows a flowchart of a UE performing a handover process according to a first embodiment of the disclosure; as shown in FIG. 7, in the embodiment, based on the scene of the system architecture shown in FIG. 1, the target MME determines whether to release the IP offload connection according to its own capability, wherein the flow comprises the following Steps 702 to 736:

Step 702: a wireless side network element determines to initiate S1 handover.

Step 704: an source wireless side network element sends a handover required message to an source MME.

Step 706: the source MME sends a forward relocation request message to a target MME.

Step 708: the target MME determines, according to its own capability, whether it supports the IP offload connection or whether it can identify the two S-GWs.

Step 710: if the target MME does not support IP offload or cannot identify the two S-GWs, the target MME only initiates a session of establishment/update/activation flow of the core network connection to the core network gateway and does not establish/update/activate the IP offload connection. The following steps are described by taking this condition for example.

If the target MME supports IP offload or can identify the two S-GWs, the target MME initiates a session of establishment/update/activation flows of the core network connection and the IP offload connection.

Step 712: the target MME requests a target wireless side network element to perform the handover, including the core network connection information and not including the IP offload connection information.

Step 714: the target wireless side network element responds a handover request acknowledge message to the target MME.

Step 716: the target MME initiates an establishment flow of tunnel forwarding to the core network gateway.

Step 718: the target MME sends a forward relocation response message to the source MME, including the core network connection information and not including the IP offload connection information.

Step 720: the source MME interacts with the source core network gateway for the establishment signaling of tunnel forwarding.

Step 722: the source MME sends a handover command to the source wireless side network element, wherein the handover command carries the bearer information needing to be released, including the bearer information of the IP offload connection.

Step 724: the source wireless side network element sends a handover command to a UE.

Step 726: the UE initiates a handover confirm message to the target wireless side network element.

Step 728: the target wireless side network element notifies the target MME to perform the handover (that is, handover notify).

Step 730: the target MME sends a forward relocation complete notification message to the source MME.

Step 732: the source MME returns a forward relocation complete acknowledge message to the target MME.

Step 734: continue the normal handover flow.

Step 736: if mobility is not supported, the source MME initiates a deletion flow of the IP offload connection to the source local gateway. Step 736 can be executed after Step 718.

In Embodiment 1, when the UE only has IP offload connection and has no core network connection, if the target MME determines that mobility cannot be supported, the target MME responds handover failure information to the source MME.

Embodiment 2

Figure 8:
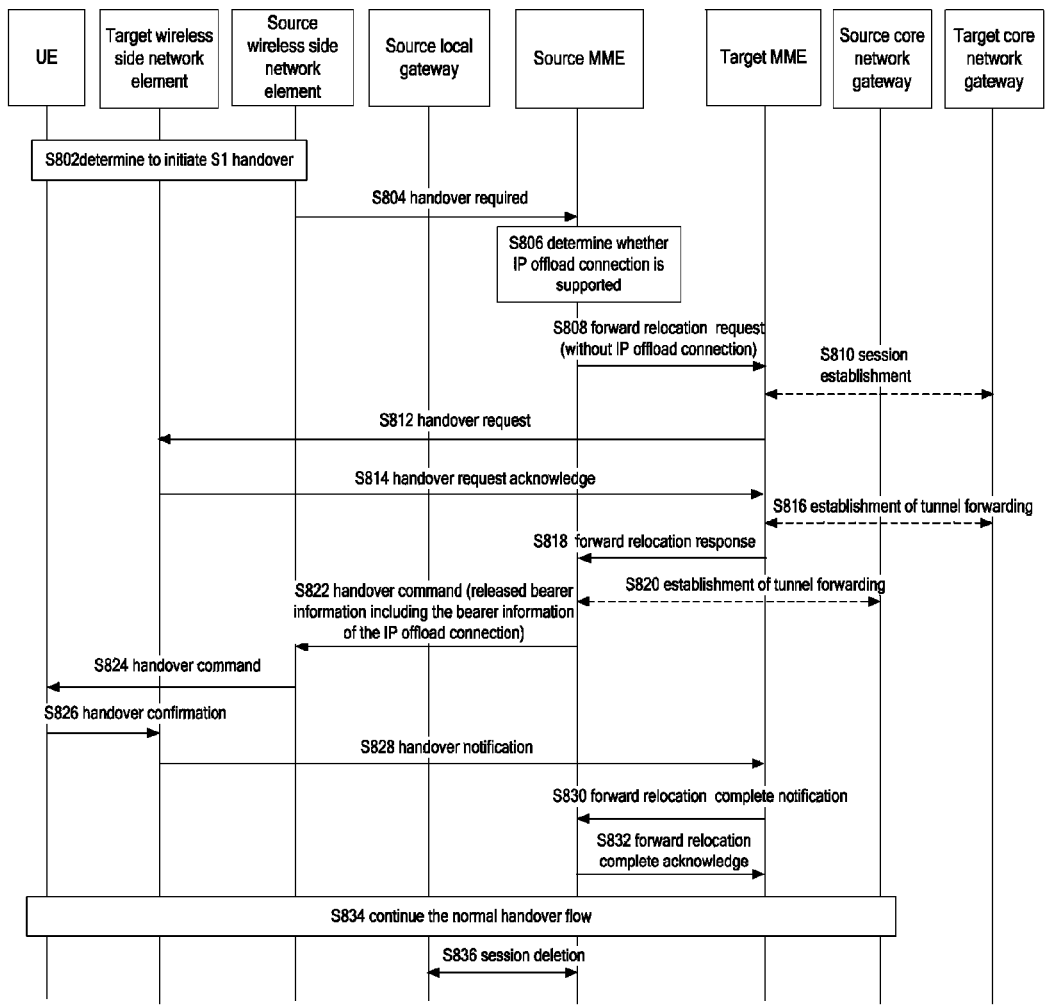
FIG. 8 shows a flowchart of a UE performing a handover process according to a second embodiment of the disclosure.

FIG. 8 shows a flowchart of a UE performing a handover process according to a second embodiment of the disclosure; as shown in FIG. 8, in the embodiment, based on the scene of the system architecture shown in FIG. 1, the source MME determines, according to the configuration, whether to send the IP offload connection information to the target MME; and the source MME locally configures the capability information of the target MME; wherein the flow comprises the following Steps 802 to 836:

Step 802: a wireless side network element determines to initiate S1 handover.

Step 804: an source wireless side network element sends a handover required message to an source MME.

Step 806: the source MME, according to the locally pre-configured capability information of the target MME or protocol version information, determines whether the target MME supports the IP offload or whether the target MME can identify the two S-GWs;

wherein the protocol version can refer to the protocol between the target MME and the source MME.

Step 808: if the target MME does not support IP offload or cannot identify the two S-GWs, the source MME includes into a forward relocation request message transmitted to the target MME the core network connection information without the IP offload connection information. The following steps are described by taking this condition for example.

If the target MME supports IP offload or can identify the two S-GWs, the source MME includes into a forward relocation request message transmitted to the target MME the core network connection information and the IP offload connection information.

Step 810: the target MME initiates a session of establishment/update/activation flow of the core network connection to the core network gateway and does not establish/update/activate the IP offload connection.

Step 812: the target MME requests a target wireless side network element to perform the handover (that is, handover request).

Step 814: the target wireless side network element responds a handover request acknowledge message to the target MME.

Step 816: the target MME initiates an establishment flow of tunnel forwarding to the core network gateway.

Step 818: the target MME sends a forward relocation response message to the source MME.

Step 820: the source MME interacts with the source core network gateway for the establishment signaling of tunnel forwarding.

Step 822: the source MME sends a handover command to the source wireless side network element, wherein the handover command carries the bearer information needing to be released, including the bearer information of the IP offload connection.

Step 824: the source wireless side network element sends a handover command to a UE.

Step 826: the UE initiates a handover confirm message to the target wireless side network element.

Step 828: the target wireless side network element notifies the target MME to perform handover.

Step 830: the target MME sends a forward relocation complete notification message to the source MME.

Step 832: the source MME returns a forward relocation complete acknowledge message to the target MME.

Step 834: continue the normal handover flow.

Step 836: if mobility is not supported, the source MME initiates a deletion flow of the IP offload connection to the source local gateway. Step 836 can be executed after Step 806.

In Embodiment 2, when the UE only has IP offload connection and has no core network connection, if the target MME determines that mobility cannot be supported, the target MME responds handover failure information to the source wireless side network element.

In order to simplify the description, the Embodiment 2 only illustrates the management mode of the IP offload connection by using the condition that the source MME locally configures the capability information of the target MME for example; besides, there is another way for the source MME to learn the capability information of the target MME, that is, the target wireless side network element informs the UE of an MME which supports IP offload connection via a broadcast message, then the UE notifies this information to the source wireless side network element which then forwards this information to the source MME through a handover request in Step 804; in this case, the other processes for the management of IP offload are similar to the embodiment above, and would cause no impact to the illustration of the embodiment, thus description is not repeated here for simplicity.

In the Embodiment 2 above, when selecting a target MME, the source MME can select the target MME that supports the IP offload connection preferentially, so as to guarantee the normal continuous operation of the IP offload connection and enhance the mobile continuity of the local IP service as far as possible.

Embodiment 3

Figure 9:
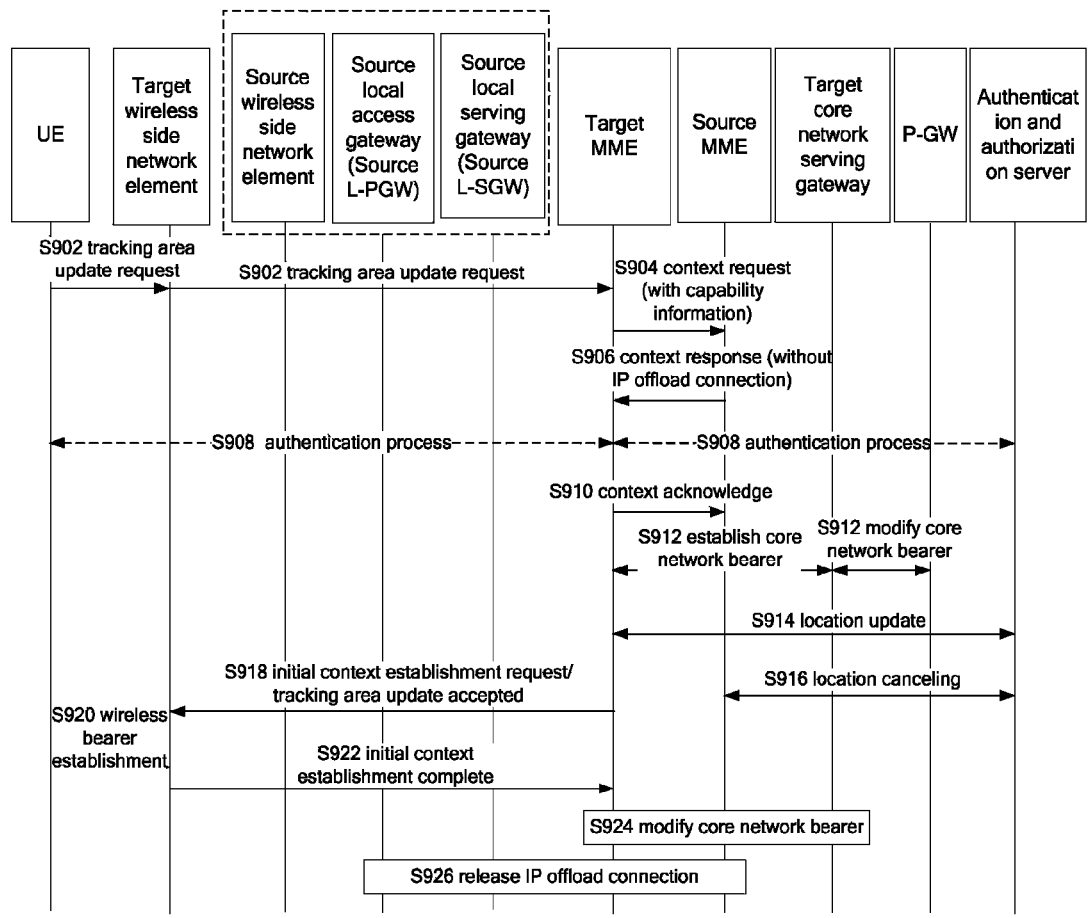
FIG. 9 shows a flowchart of a UE performing a location update process according to a third embodiment of the disclosure.

FIG. 9 shows a flowchart of a UE performing a location update process according to a third embodiment of the disclosure; as shown in FIG. 9, in the embodiment, based on the scene of the system architecture shown in FIG. 1, the source MME determines whether to send the IP offload connection information to the target MME, and a wireless bearer is needed, wherein the flow comprises the following Steps 902 to 926. Step 902: a UE sends a tracking area update request message to a target MME through a target wireless side network element, including an activation identifier.

Step 904: the target MME sends a context request message to an source MME, the message including the capability information of the target MME indicating whether IP offload is supported or whether two S-GWs can be identified.

The method of indicating that the target MME supports IP offload is to include the information of the target MME supporting the IP offload in the capability information;

the method of indicating that the target MME does not support IP offload is to include the information of the target MME not supporting the IP offload in the capability information or not to include the information of the target MME supporting the IP offload in the capability information; and the method of indicating whether the target MME identifies two S-GWs is similar to the above method for indicating whether the target MME supports IP offload connection.

Step 906: if the target MME does not support IP offload or cannot identify the two S-GWs, a context answer message (that is, context response message) transmitted to the target MME from the source MME carries the core network connection information without the IP offload connection information. The following steps are described by using this condition for example.

If the target MME supports IP offload or can identify the two S-GWs, a context answer message transmitted to the target MME from the source MME carries the core network connection information and the IP offload connection information.

Step 908: optionally, the UE, the MME and the authentication and authorization server perform an authentication process.

Step 910: the target MME sends a context acknowledge message to the source MME.

Step 912: the target MME initiates a bearer establishment operation to the core network S-GW, without modifying the IP offload connection information. The core network S-GW and the P-GW perform the bearer modification process of the core network connection there-between.

Step 914: the target MME and the authentication and authorization server perform a location update process therebetween.

Step 916: the authentication and authorization server and the source MME perform a location canceling process therebetween.

Step 918: the target MME sends an initial context establishment request message (that is, tracking area update accepted) to the target wireless side network element.

Step 920: the target wireless side network element performs a wireless bearer establishment process.

Step 922: the target wireless side network responds an initial context establishment complete/wireless bearer establishment complete message to the target MME.

Step 924: the MME requests the core network S-GW to perform bearer modification, so as to activate/establish/update the core network connection of the UE; the core network S-GW sends a bearer modification response message to the MME. Optionally, the core network S-GW sends a bearer modification request message to the core network P-GW.

Step 926: the source MME initiates a local IP connection release process.

Step 926 can be executed after Step 904.

In Embodiment 3, when the UE only has IP offload connection and has no core network connection, if the target MME determines that mobility cannot be supported, failure information can be carried in Step 906; then the source MME initiates a release operation of the IP offload connection.

Embodiment 4

Figure 10:
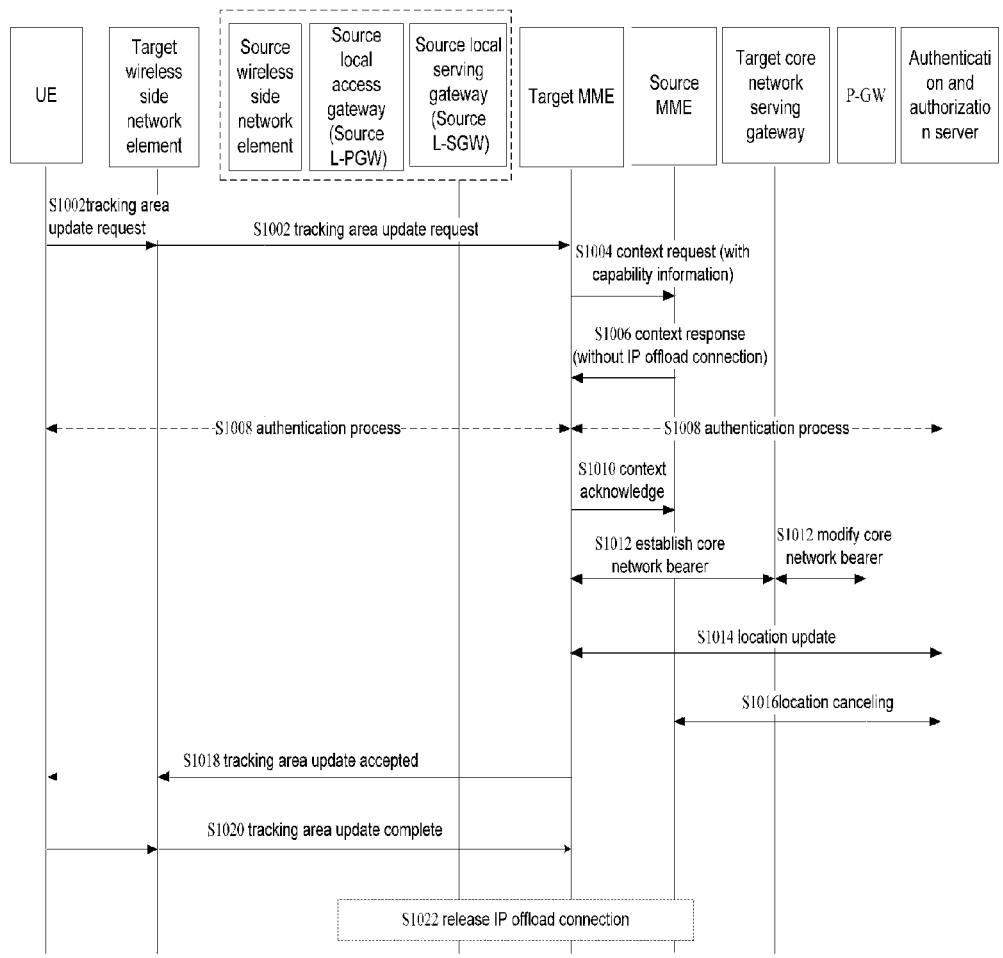
FIG. 10 shows a flowchart of a UE performing a location update process according to a fourth embodiment of the disclosure.

FIG. 10 shows a flowchart of a UE performing a location update process according to a fourth embodiment of the disclosure; as shown in FIG. 10, in the embodiment, based on the scene of the system architecture shown in FIG. 1, the source MME determines whether to send the IP offload connection information to the target MME, and a wireless bearer is not needed, wherein the flow comprises the following Steps 1002 to 1022.

Step 1002: a UE sends a tracking area update request message to a target MME through a target wireless side network element, including no activation identifier.

Step 1004: the target MME sends a context request message to an source MME, the message including the capability information of the target MME for indicating whether IP offload is supported or whether two S-GWs can be identified.

The method of indicating that the target MME supports IP offload is to include the information of the target MME supporting the IP offload in the capability information;

the method of indicating whether the target MME identifies two S-GWs is similar to the above method for indicating whether the target MME supports IP offload connection; and the method of indicating whether the target MME identifies two S-GWs is similar to the above method for indicating whether the target MME supports IP offload connection.

Step 1006: if the target MME does not support IP offload or cannot identify the two S-GWs, a context answer message transmitted to the target MME from the source MME carries the core network connection information without the IP offload connection information. Optionally, an IP offload failure indicator is carried or a bearer state indicator needs to be carried, for the target MME to carry bearer state information in the message in Step 1018. The following steps are described by taking this condition for example.

If the target MME supports IP offload or can identify the two S-GWs, a context answer message transmitted to the target MME from the source MME carries the core network connection information and the IP offload connection information.

Step 1008: optionally, the UE, the target MME and the authentication and authorization server perform an authentication process.

Step 1010: the target MME sends a context acknowledge message to the source MME.

Step 1012: the target MME initiates a bearer establishment operation to the core network S-GW, without modifying the IP offload connection information. The core network S-GW and the P-GW perform the bearer modification process of the core network connection there-between.

Step 1014: the target MME and the authentication and authorization server perform a location update process there-between.

Step 1016: the authentication and authorization server and the source MME perform a location canceling process there-between.

Step 1018: the target MME sends a tracking area update accepted message to the UE through the target wireless side network element. Optionally, if Step 1006 carries an IP offload failure indicator or needs to carry a bearer state indicator, Step 1018 needs to carry the bearer state information, for the UE to delete the IP offload connection information.

Step 1020: the UE responds a tracking area update complete message to the target MME through the target wireless side network element.

Step 1022: the source MME initiates a local IP connection release process.

Step 1022 can be executed after Step 1004.

In Embodiment 4, when the UE only has IP offload connection and has no core network connection, if the target MME determines that mobility cannot be supported, failure information can be carried in Step 1006; then the source MME initiates a release operation of the IP offload connection.

Embodiment 5

Figure 11:
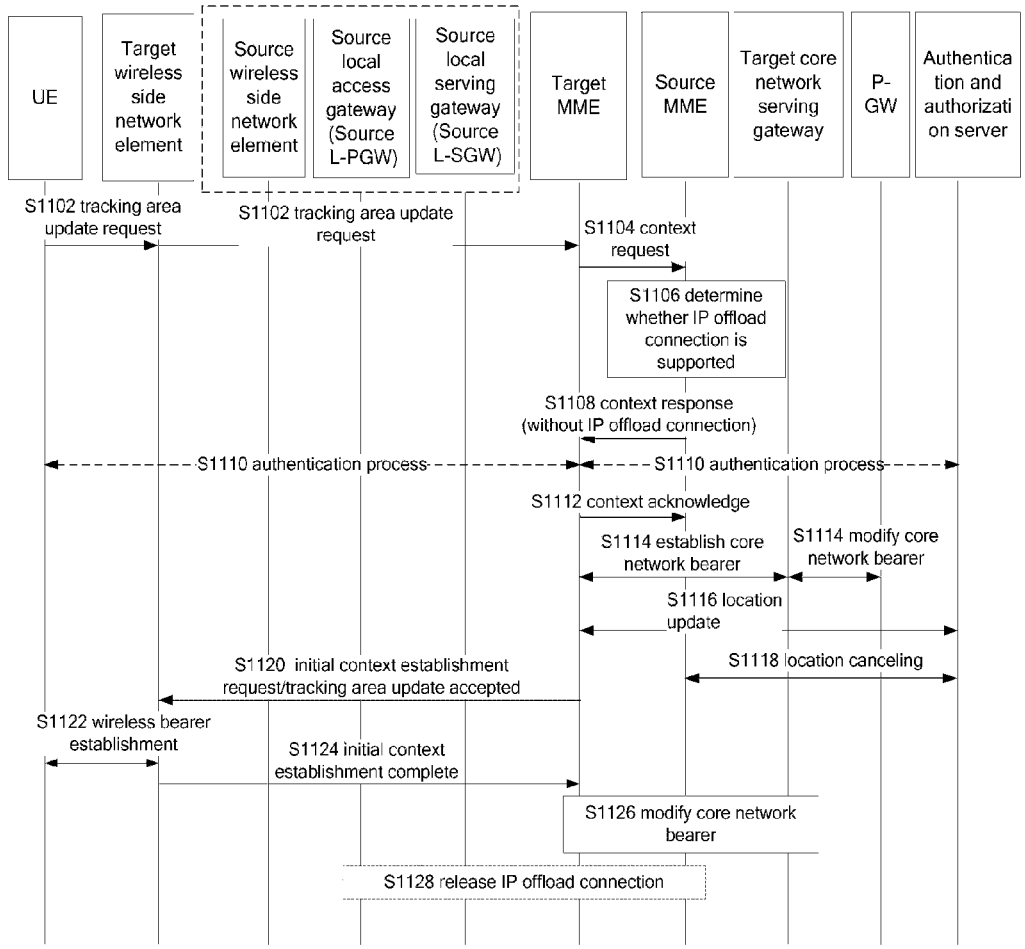
FIG. 11 shows a flowchart of a UE performing a location update process according to a fifth embodiment of the disclosure.

FIG. 11 shows a flowchart of a UE performing a location update process according to a fifth embodiment of the disclosure; as shown in FIG. 11, in the embodiment, based on the scene of the system architecture shown in FIG. 1, the source MME determines whether to carry the IP offload connection information to the target MME, the source MME locally configures the capability information of the target MME, and a wireless bearer is not needed, wherein the flow comprises the following Steps 1102 to 1128.

Step 1102: a UE sends a tracking area update request message to an MME through a target wireless side network element, the message including an activation identifier.

Step 1104: a target MME sends a context request message to an source MME.

Step 1106: the source MME checks the locally configured capability information of the target MME or protocol version information, if it is found that the target MME does not support IP offload or cannot identify the two S-GWs, a context answer message transmitted to the target MME from the source MME carries the core network connection information without the IP offload connection information. The following steps are described by taking this condition for example;

if the target MME supports IP offload or can identify the two S-GWs, a context answer message transmitted to the target MME from the source MME carries the core network connection information and the IP offload connection information;

Wherein, the protocol version can refer to the protocol between the target MME and the source MME.

Step 1108: the context answer message transmitted to the target MME from the source MME carries the core network connection information but without the IP offload connection information.

Step 1110: optionally, the UE, the target MME and the authentication and authorization server perform an authentication process.

Step 1112: the target MME sends a context acknowledge message to the source MME.

Step 1114: the target MME initiates a bearer establishment operation to the core network S-GW, without modifying the IP offload connection information. The core network S-GW and the P-GW perform the bearer modification process of the core network connection there-between.

Step 1116: the target MME and the authentication and authorization server perform a location update process there-between.

Step 1118: the authentication and authorization server and the source MME perform a location canceling process there-between.

Step 1120: the target MME sends an initial context establishment request message to the target wireless side network element.

Step 1122: the target wireless side network element performs a wireless bearer establishment process.

Step 1124: the target wireless side network responds an initial context establishment complete/wireless bearer establishment complete message to the target MME.

Step 1126: the target MME requests the core network S-GW to perform bearer modification, so as to activate/establish/update the core network connection of the UE; the core network S-GW sends a bearer modification response message to the MME. Optionally, the core network S-GW sends a bearer modification request message to the core network P-GW.

Step 1128: the source MME initiates a local IP connection release process.

Step 1128 can be executed after Step 1104.

In Embodiment 5, when the UE only has IP offload connection and has no core network connection, and if the target MME determines that mobility cannot be supported, failure information can be carried in Step 1108; then the source MME initiates a release operation of the IP offload connection.

In order to simplify the description, the Embodiment 5 only illustrates the management mode of the IP offload connection by taking the condition of the location update of bearer establishment for example; in Step 1108, an IP offload failure indicator can be carried or a bearer state indicator needs to be carried, for the target MME to carry bearer state information in the message in Step 1120. In addition, other processes for the management of IP offload are similar to the embodiment above, and would cause no impact to the illustration of the disclosure, thus description is not repeated here.

Embodiment 6

Figure 12:
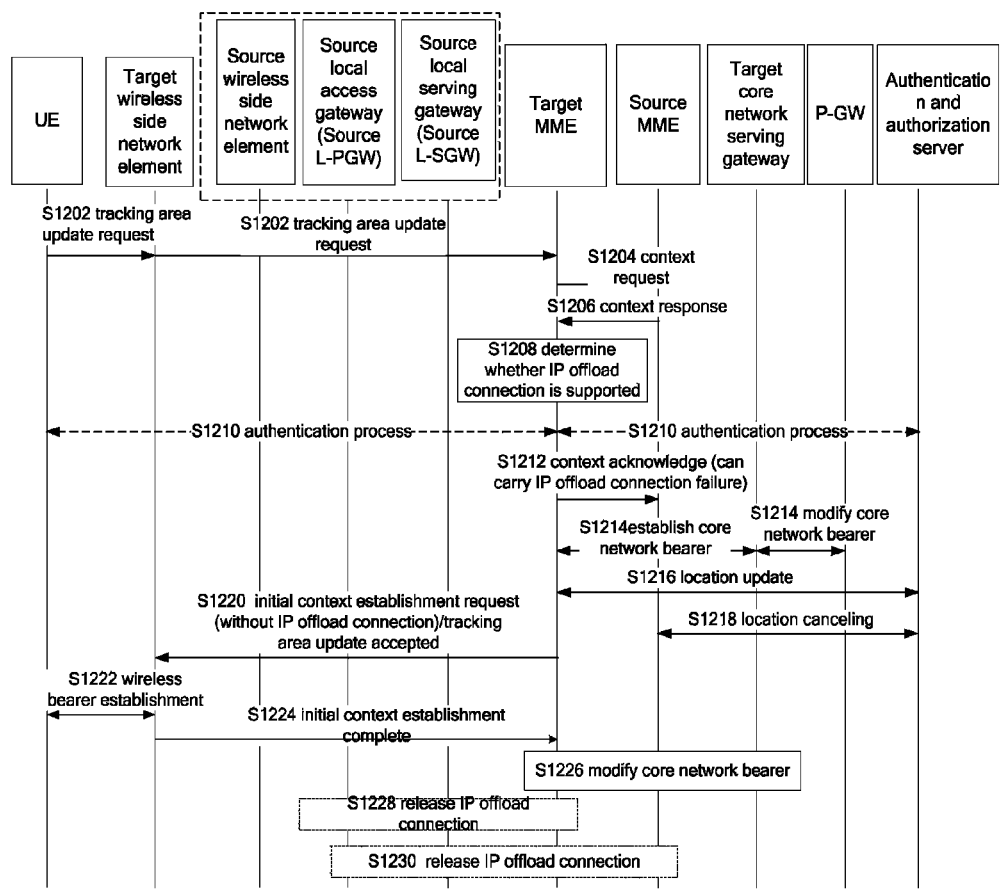
FIG. 12 shows a flowchart of a UE performing a location update process according to a sixth embodiment of the disclosure.

FIG. 12 shows a flowchart of a UE performing a location update process according to a sixth embodiment of the disclosure; as shown in FIG. 12, in the embodiment, based on the scene of the system architecture shown in FIG. 1, the target MME determines whether to activate/establish/update IP offload connection, and a wireless bearer is not needed; wherein the flow comprises the following Steps S1202 to S1230.

Step 1202: a UE sends a tracking area update request message to a target MME through a target wireless side network element, the message including an activation identifier.

Step 1204: the target MME sends a context request message to an source MME.

Step 1206: the source MME sends a context answer message to the target MME.

Step 1208: the target MME, according to its own capability, determines whether it supports IP offload connection or whether it can identify the two S-GWs.

Step 1210: optionally, the UE, the target MME and the authentication and authorization server perform an authentication process.

Step 1212: if the target MME does not support IP offload or cannot identify the two S-GWs, a context acknowledge message transmitted to the source MME from the target MME can carry IP offload connection failure information. The following steps are described by taking this condition for example.

If the target MME supports IP offload or can identify the two S-GWs, a context acknowledge message transmitted to the source MME from the target MME does not need to carry IP offload connection failure information.

The method for indicating that the target MME supports IP offload connection includes: including an IP offload available indicator or not including an IP offload unavailable indicator, the carried accepted bearer information including a bearer of IP offload connection, the carried unaccepted bearer information not including a bearer of IP offload connection;

the method for indicating that the target MME does not support IP offload connection includes: including an IP offload unavailable indicator or not including an IP offload available indicator, the carried accepted bearer information not including a bearer of IP offload connection, the carried unaccepted bearer information including a bearer of IP offload connection.

Step 1214: the target MME initiates a bearer establishment operation to the core network S-GW, without modifying the IP offload connection information. The core network S-GW and the P-GW perform the bearer modification process of the core network connection there-between.

Step 1216: the target MME and the authentication and authorization server perform a location update process there-between.

Step 1218: the authentication and authorization server and the source MME perform a location canceling process there-between.

Step 1220: the target MME sends an initial context establishment request message to the target wireless side network element, the message including the core network connection information without the IP offload connection information.

Step 1222: the target wireless side network element performs a wireless bearer establishment process.

Step 1224: the target wireless side network responds an initial context establishment complete/wireless bearer establishment complete message to the target MME.

Step 1226: the MME requests the core network S-GW to perform bearer modification, so as to activate/establish/update the core network connection of the UE; the core network S-GW sends a bearer modification response message to the MME. Optionally, the core network S-GW sends a bearer modification request message to the core network P-GW.

Step 1228: optionally, the target MME initiates a local IP connection release process.

Step 1230: optionally, the source MME initiates a local IP connection release process.

Step 1228 can be executed after Step 1208. Step 1230 can be executed after Step 1212.

In Embodiment 6, when the UE only has IP offload connection and has no core network connection, if the target MME determines that mobility cannot be supported, the target MME responds update failure information to the source MME or the target wireless side network element.

In order to simplify the description, the Embodiment 6 only illustrates the management mode of the IP offload connection by taking the condition of the location update of bearer establishment for example. In the case of not establishing a bearer, the target MME can carry the bearer state information in the message in Step 1220; in addition, other processes for the management of IP offload are similar to the embodiment above, and would cause no impact to the illustration of the disclosure, thus description is not repeated here.

Figure 2:
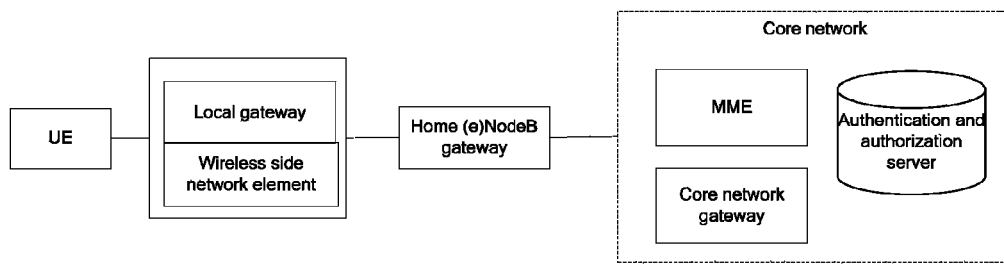
FIG. 2 shows a second diagram of the connection of a wireless communication network according to relevant technology.
Figure 3:
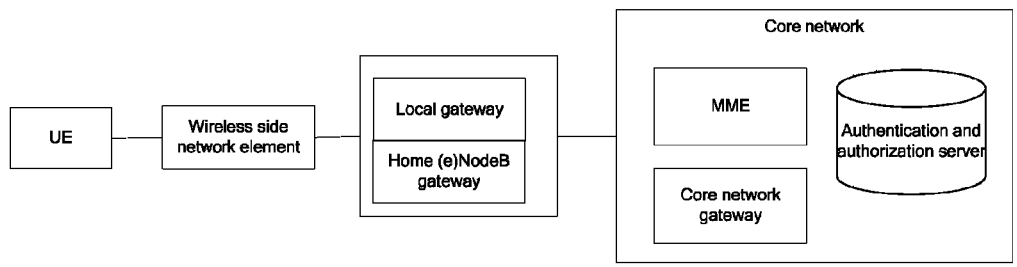
FIG. 3 shows a third diagram of the connection of a wireless communication network according to relevant technology.
Figure 4:
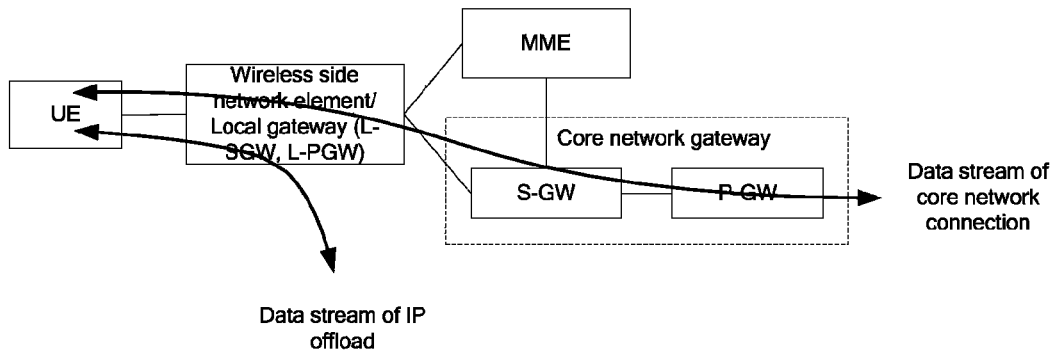
FIG. 4 shows a diagram of the local IP access data stream of a wireless communication system according to relevant technology.
Figure 5:
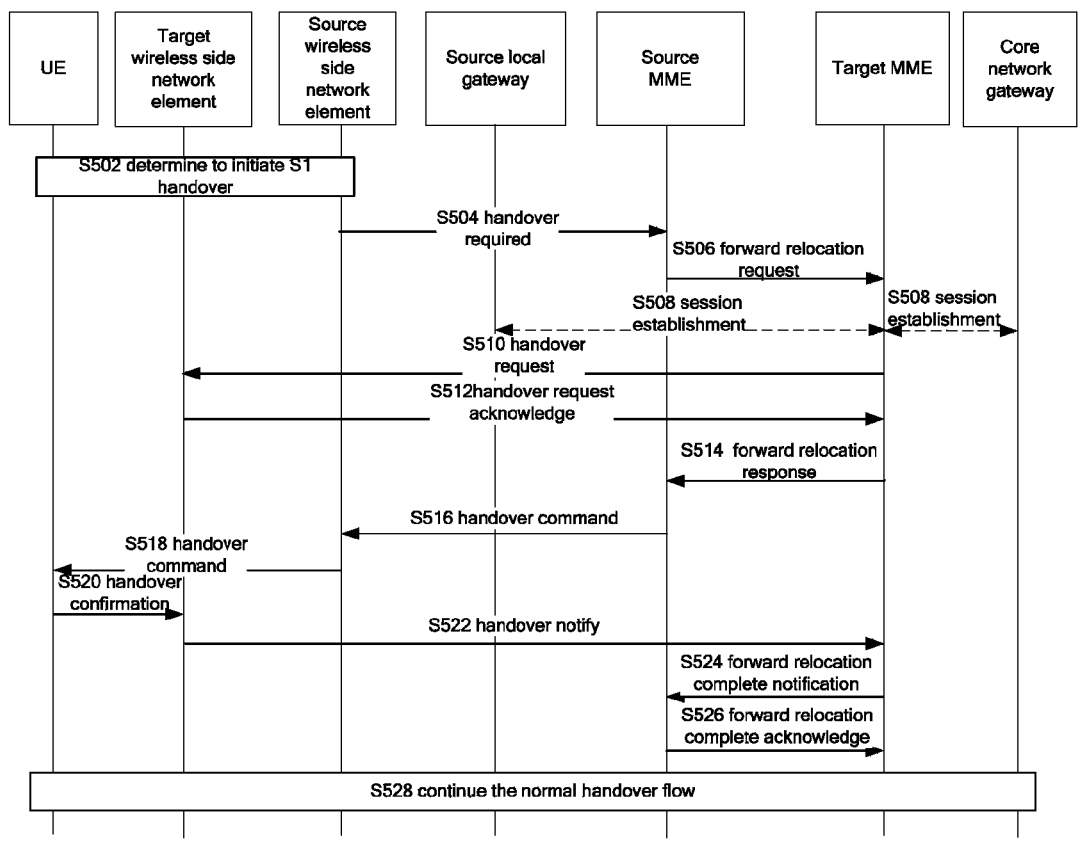
FIG. 5 shows a flowchart of the interaction of a UE performing a handover process according to relevant technology.

In order to simplify the description, the Embodiment 1 to Embodiment 6 only illustrate the management mode of the IP offload connection by taking the scene of the system architecture shown in FIG. 1 for example. In the cases of FIG. 2, FIG. 3 and UTRAN system, the mode for IP offload management is similar to the embodiment above, and would cause no impact to the illustration of the disclosure, thus description is not repeated here.

In addition, in the embodiment above, the wireless side network element can be a base station, a Home (e)NodeB, an RNC, a Home (e)NodeB gateway, a local gateway, a offload function entity, an NAT gateway. The MME can be a Mobility Management Entity (MME), a Mobile Switching Centre (MSC), a Serving GPRS Support Node (SGSN). The local gateway can be a Local SGW (L-SGW) and a Local PGW (L-PGW), can be a single L-PGW, can be a Local GGSN (L-GGSN) and a Local SGSN (L-SGSN), can be a single L-GGSN, and can be a traffic offload function entity. The local gateway can be a local access gateway and/or a local S-GW. The local access gateway is an L-PGW, an L-GGSN. The local S-GW is an L-SGW, an L-SGSN. The core network gateway can be a core network S-GW, a core network access gateway. The core network S-GW can be an S-GW, an SGSN. The core network access gateway can be a P-GW, a GGSN. The authentication and authorization server can be a user subscription database;

The two S-GWs can be an L-SGW and an S-GW.

The process of an MME supporting IP offload may comprise: the MME can perform the IP offload connection related operations, for example, select a local gateway of the IP offload connection (further, the selection method can select the local gateway of the IP offload connection through the wireless side network element information) or perform an access control on the IP offload connection or perform a mobility judgment to the IP offload connection (further, the judgment method can be performed according to a CSG or a local gateway). Otherwise, the process of the MME not supporting IP offload indicates that: the MME cannot perform the IP offload connection related operations, for example, cannot select a local gateway of the IP offload connection, cannot perform an access control on the IP offload connection or cannot perform a mobility judgment to the IP offload connection.

The wireless side network element of the IP offload may have the same address as the local gateway.

The location update can be tracking area update, routing area update.

The IP offload connection can be: a local IP access to residential IP network, a local IP access to enterprise IP network, a local IP access to Internet, an Internet offload and a selected IP traffic offload.

According to the embodiment of the disclosure, a method for managing IP offload connection is provided, which provides a guarantee for the normal continuous operation of the core network connection and enhances the experience of the user in the wireless communication system by the processes of: an source MME determining that a target MME supports IP offload or identifies two S-GWs, then the target MME receiving IP offload connection information from the source MME, and the target MME establishing/updating/activating the IP offload connection according to the IP offload connection information.

It should be noted that the steps illustrated in the flowchart shown in accompanying drawings can be carried out in a computer system in which a group of computers can execute instructions. Although a logical order is shown in the flowchart, the illustrated or described steps may be carried out in a different order in some cases.

Figure 13:
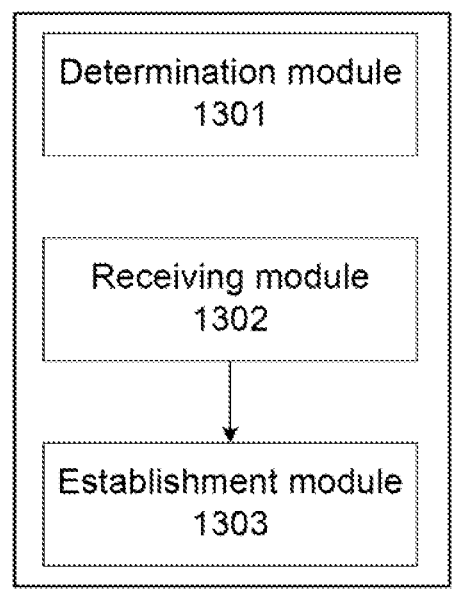
FIG. 13 shows a structure diagram of a device for managing IP offload connection according to the embodiment of the disclosure.

A device for managing IP offload connection is further provided, wherein the device can implement the embodiment above and the preferable implementation thereof; the described embodiment and implementations are not described again here; hereinafter, the involved modules are described. FIG. 13 shows a structure diagram of a device for managing IP offload connection according to the embodiment of the disclosure; as shown in FIG. 13, the device comprises: a determination module 1301, a receiving module 1302 and an establishment module 1303. The structure is described below in detail.

The determination module 1301 is configured to determine that a target MME supports IP offload or identifies two S-GWs, and can be applied to the source MME or the target MME mentioned above; the receiving module 1302 is configured to receive IP offload connection information from the source MME; the establishment module 1303 is connected to the receiving module 1302 and is configured to establish/update/activate the IP offload connection according to the IP offload connection information received by the receiving module 1302.

Figure 14:
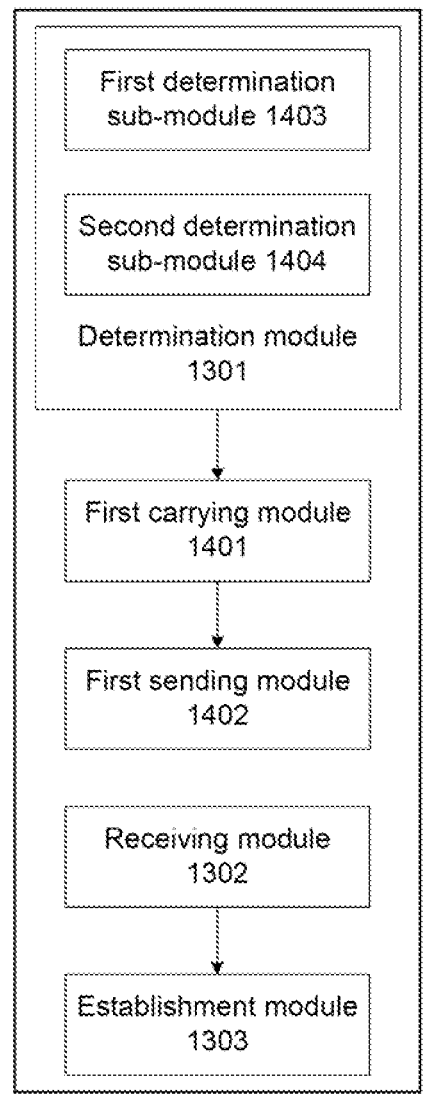
FIG. 14 shows a preferred structure diagram of a device for managing IP offload connection according to the embodiment of the disclosure.

FIG. 14 shows a preferred structure diagram of a device for managing IP offload connection according to the embodiment of the disclosure; as shown in FIG. 14, based on the modules in FIG. 13, the device further comprises a first carrying module 1401 connected to the determination module 1301 and configured to carry first capability information in a context request message according to the determination result of the determination module 1301, wherein the first capability information is configured to indicate that the target MME supports the IP offload or identifies the information of a target S-GW and a local S-GW; a first sending module 1402 connected to the first carrying module 1401 and configured to send a context request message in which the first carrying module 1401 carries the first capability information to the source MME.

Meanwhile, the determination module comprises: a first determination sub-module 1403 configured to determine that the target MME supports IP offload or identifies two S-GWs; a second determination sub-module 1404 configured, according to the capability information of the target MME locally pre-configured by the source MME or protocol version information, determine that the target MME supports the IP offload or identifies the information of the two S-GWs, wherein the protocol version refers to the protocol between the target MME and the source MME.

To sum up, according to the embodiment of the disclosure, a method and a device for managing IP offload connection are provided; by determining that a target MME supports IP offload or identifies two S-GWs, then the target MME receiving IP offload connection information from an source MME, and the target MME establishing/updating/activating the IP offload connection according to the IP offload connection information, wherein the step of determining that a target MME supports IP offload or identifies two S-GWs can be determined through the source MME or the target MME, the disclosure provides a guarantee for the normal continuous operation of the core network connection and enhances the experience of the user in the wireless communication system.

Obviously, those skilled in the art should understand that the modules and steps described above can be implemented by a common computer device; the modules or steps can be integrated on a single computing device or distributed on a network composed of a plurality of computing devices; optionally, the modules or steps can be implemented by a programming code executable by a computing device, thus they can be stored in a storage device to execute by a computing device, or manufactured into individual integrated circuit module respectively, or several of them can be manufactured into a single integrated circuit module to realize; in this way, the disclosure is not limited to any combination of specific hardware and software The above is only the preferred embodiment of the disclosure and not intended to limit the disclosure. For those skilled in the art, various modifications and changes can be made to the disclosure. Any modification, equivalent substitute and improvement within the spirit and principle of the present disclosure are deemed to be included within the scope of the disclosure.

What is claimed is:

1. A method for managing Internet Protocol (IP) offload connection, comprising the steps of:
   determining that a target Mobility Management Entity (MME) supports IP offload or identifies two Serving Gateways (S-GWs);
   the target MME receiving IP offload connection information from a source MME; and
   the target MME processing the IP offload connection according to the IP offload connection information, wherein the processing includes one of the following: establishing, updating and activating the IP offload connection.

2. The method according to claim 1, wherein the step of determining that the target MME supports IP offload or identifies two S-GWs further comprises:
   the target MME determining that the target MME supports the IP offload or identifies the two S-GWs.

3. The method according to claim 2, further comprising a step of:
   after the target MME determines that the target MME supports the IP offload or identifies the two S-GWs, the target MME transmitting a context request message to the source MME and including first capability information into the context request message, wherein the first capability information represents that the target MME supports the IP offload or identifies the two S-GWs.

4. The method according to claim 3, wherein the IP offload comprises one of the following: a local IP access to residential IP network, a local IP access to enterprise IP network, a local IP access to Internet, an Internet offload and a selected IP traffic offload.

5. The method according to claim 2, wherein the step of the target MME determining that the target MME supports the IP offload or identifies the two S-GWs comprises the steps of:
   the target MME, according to its own capability, determining whether it supports the IP offload locally or identifies the two S-GWs; and
   if it is determined to be true, the target MME determining that the target MME supports the IP offload or identifies the two S-GWs.

6. The method according to claim 5, further comprising a step of:
   if it is determined to be false, the target MME including second capability information into the context request message transmitted to the source MME, wherein the second capability information represents information indicating that the target MME does not support the IP offload connection and does not identify the two S-GWs.

7. The method according to claim 6, further comprising the steps of:
   after the target MME transmitting the context request message to the source MME:
      the target MME canceling the process of the IP offload connection; and
      the target MME performing a session process of the core network connection, wherein the session process includes at least one of the following: establishment, update, and activation.

8. The method according to claim 7, wherein the IP offload comprises one of the following: a local IP access to residential IP network, a local IP access to enterprise IP network, a local IP access to Internet, an Internet offload and a selected IP traffic offload.

9. The method according to claim 6, wherein the IP offload comprises one of the following: a local IP access to residential IP network, a local IP access to enterprise IP network, a local IP access to Internet, an Internet offload and a selected IP traffic offload.

10. The method according to claim 5, wherein the IP offload comprises one of the following: a local IP access to residential IP network, a local IP access to enterprise IP network, a local IP access to Internet, an Internet offload and a selected IP traffic offload.

11. The method according to claim 2, wherein the IP offload comprises one of the following: a local IP access to residential IP network, a local IP access to enterprise IP network, a local IP access to Internet, an Internet offload and a selected IP traffic offload.

12. The method according to claim 1, wherein the step of determining that the target MME supports the IP offload or identifies the two S-GWs further comprises a step of:
   the source MME determining that the target MME supports the IP offload or identifies the two S-GWs according to locally pre-configured capability information of the target MME or protocol version information, wherein the protocol version refers to a protocol between the target MME and the source MME.

13. The method according to claim 12, further comprising a step of:
   the source MME, according to the locally pre-configured capability information of the target MME or protocol version information, determining whether the target MME supports the IP offload or whether the target MME can identify the two S-GWs; and
   if the target MME supports IP offload or can identify the two S-GWs, the source MME including into a forward relocation request message or context response transmitted to the target MME the core network connection information and the IP offload connection information.

14. The method according to claim 13, wherein the IP offload comprises one of the following: a local IP access to residential IP network, a local IP access to enterprise IP network, a local IP access to Internet, an Internet offload and a selected IP traffic offload.

15. The method according to claim 12, further comprising a step of:
   the source MME, according to the locally pre-configured capability information of the target MME or protocol version information, determining whether the target MME supports the IP offload or whether the target MME can identify the two S-GWs;
   if the target MME does not support IP offload or cannot identify the two S-GWs, the source MME including into a forward relocation request message or context response transmitted to the target MME the core network connection information without the IP offload connection information.

16. The method according to claim 15, wherein the IP offload comprises one of the following: a local IP access to residential IP network, a local IP access to enterprise IP network, a local IP access to Internet, an Internet offload and a selected IP traffic offload.

17. The method according to claim 12, wherein the IP offload comprises one of the following: a local IP access to residential IP network, a local IP access to enterprise IP network, a local IP access to Internet, an Internet offload and a selected IP traffic offload.

18. The method according to claim 1, wherein the IP offload comprises one of the following:
- a local IP access to residential IP network, a local IP access to enterprise IP network, a local IP access to Internet, an Internet offload and a selected IP traffic offload.

19. The method according to claim 1, wherein the two S-GWs are a core network S-GW and a local S-GW.

20. A device for managing IP offload connection, comprising:
- a determination module configured to determine that a target MME supports IP offload or identifies two S-GWs;
- a receiving module configured to receive IP offload connection information from an source MME; and
- an establishment module configured to process the IP offload connection according to the IP offload connection information, wherein the process comprises one of the following:
- establishment, update and activation of the IP offload connection.

* * * * *